March 17, 1931.  C. H. SMOOT  1,796,967
REGULATOR
Filed Aug. 13, 1928

INVENTOR
*Charles H. Smoot,*
BY *Eyre Scott & Keel*
ATTORNEYS

Patented Mar. 17, 1931

1,796,967

UNITED STATES PATENT OFFICE

CHARLES H. SMOOT, OF MAPLEWOOD, NEW JERSEY

REGULATOR

Application filed August 13, 1928. Serial No. 299,246.

My invention relates to the art of regulation and comprises a sensitive, anti-hunting regulator of the type wherein a force varying as a function of the element controlled opposes a regulating force to effect the regulation.

More particularly, my invention relates to a regulator in which the force varying as a function of the element controlled, is electrical, and in which electrical power means are utilized in effecting the regulation.

My present invention is a specific embodiment of, and in some respects an improvement over, the regulator disclosed and broadly claimed in my Patent No. 1,658,577, dated February 7, 1928.

Figure 1:
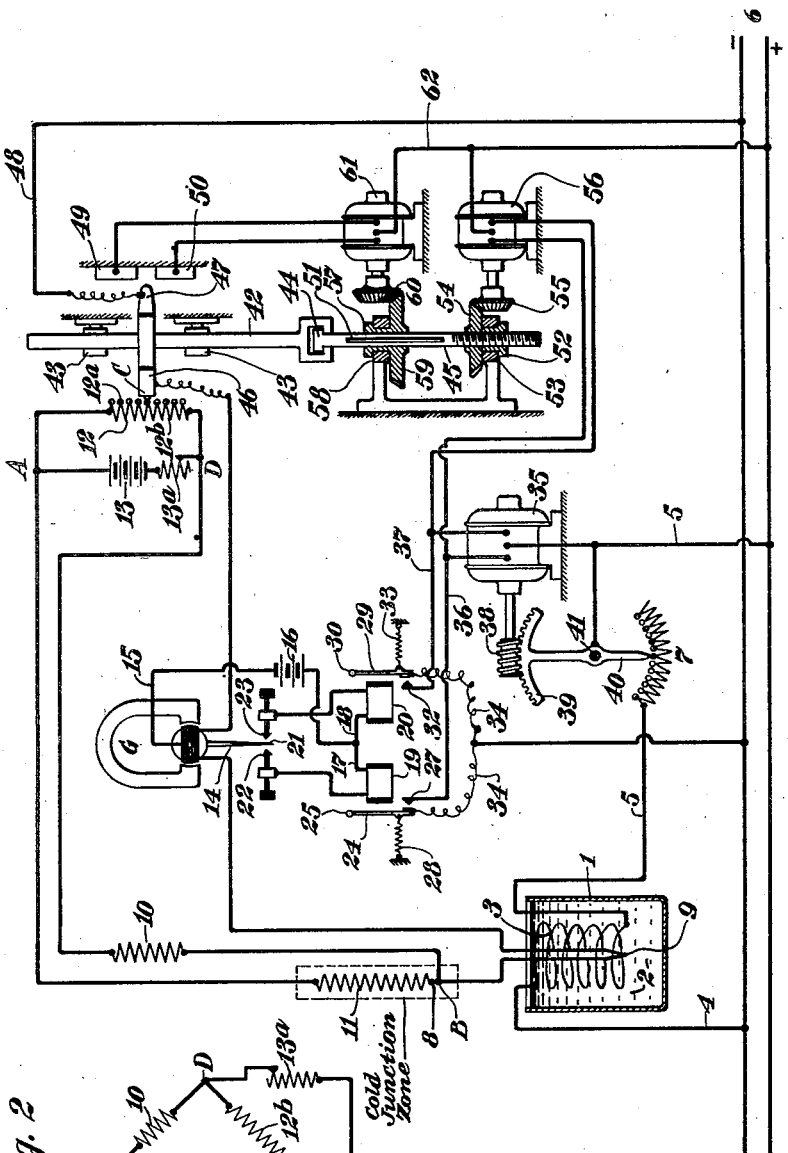
Figure 2:
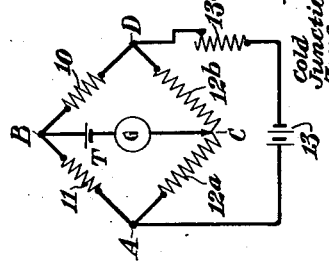

For an understanding of my invention and of the advantages pertaining thereto, reference should be had to the accompanying drawings of which Fig. 1 is a diagrammatic illustration of my regulator as applied to the control of temperature, and Fig. 2 is a simplified representation of the controlling electrical circuit of Fig. 1.

Referring to the drawings, 1 represents a vessel, the liquid contents 2 of which is heated electrically by a coil 3 receiving current through leads 4 and 5 connected to power mains 6. A variable resistance 7 in the lead 5 affords means for regulating the heating current. In the particular embodiment illustrated the regulator is arranged to maintain the liquid at a constant temperature. The controlling electrical circuit is in the form of a Wheatstone bridge arrangement. In series with a galvanometer G is a thermocouple having junctions 8 and 9, the junction 9 being immersed in the liquid 2, the temperature of which is to be controlled. In Fig. 2 the thermocouple is indicated symbolically as a source of E. M. F. at T. The junction 8 is connected to the bridge at the point B between two resistances 10 and 11 forming two arms of the bridge. The other two arms are formed by a resistance 12 divided into portions 12a and 12b by a sliding contactor C to which the other side of the galvanometer is connected.
A standard cell 13 in series with a suitable resistance 13a is connected across the resistance 12 between the points A and D. With the circuit above described, with properly proportioned resistances, no current will flow through the galvanometer when the E. M. F. generated by the thermocouple has a definite relation to the E. M. F. of the cell 13. If, however, the temperature of the liquid 2 changes, the E. M. F. of the thermocouple will be affected, and current will flow in one direction or the other through the galvanometer and deflect the galvanometer needle 14. This deflection of the galvanometer needle is utilized to effect the regulation of the resistance 7 to return the temperature of the liquid to that desired. For this purpose the needle 14 is connected by means of a conductor 15 to one terminal of a battery 16, the other terminal of which is connected through branching leads 17 and 18 to terminals on electromagnets 19 and 20. Upon deflection of the needle 14, a contact 21 thereon closes the circuit of one or the other of the electromagnets 19 and 20 by means of the fixed contacts 22 and 23 located at either side of the contact 21 and connected to the terminals of electromagnets 19 and 20 respectively. Energization of electromagnet 19 attracts an armature 24. The armature 24 comprises a light movable conductor hinged at 25 to a fixed support and adapted, when attracted by the electromagnet 19, to make contact with a fixed contactor 27. A spring 28 attached at one end to a fixed support, and at the other to the armature 24, maintains the armature out of contact with contactor 27 except when the electromagnet 19 is energized. An armature 29 hinged at 30 to a fixed support is similarly associated with electromagnet 20 to make contact with a contactor 32 against the tension of spring 33 upon energization of electromagnet 20. Armatures 24 and 29 are connected to each other by a flexible conductor 34, the mid point of which is connected to the negative side of the power mains 6. A reversible motor 35, having one terminal connected to the positive side of the mains 6, is connected through leads 36 and 37 to the contactors 27 and 32 respectively. The motor 35 varies the resistance 7 by means of worm gear 38 on the shaft of the motor meshing with a rack 39 forming a part of the movable arm 40 of the resistance. The arm 40 is pivoted to a fixed support at 41 and sweeps over contacts on the resistance 7 when the rack is driven by the motor 35.

The apparatus and circuits so far described would operate to maintain a constant temperature of the liquid 2 only with hunting. With the junction 8 of the thermocouple at a constant temperature lower than that of the liquid 2, and with the positive terminal of cell 13 connected to the point A of the bridge as shown, a rise in the temperature of the liquid 2 over the desired value would cause current to flow through the galvanometer coils in the direction from C to B, causing a deflection of the needle 14 and a closing of contacts 21 and 22 and energization of electromagnet 19. The circuit of motor 35 is then closed through armature 24 and contact 27 by the attraction of the armature by the electromagnet 19 and the motor 35 operates to swing the contact point of arm 40 to the right, thus increasing the resistance 7 in series with the heating coil. The consequent reduction in heating current will gradually reduce the temperature of the liquid 2 and return the E. M. F. of the thermocouple to the desired value, thus causing the needle 14 of the galvanometer to return to the mid position, breaking the circuit of motor 35. There is a lag, however, between the change in the resistance 7 and the temperature change of the liquid, depending of course upon the quantity of liquid, its specific heat, proximity of the junction 9 to the heating coil, etc. The effect of this lag is that by the time the circuit of motor 35 is broken the resistance 7 has been increased to too great an extent and hunting will occur.

The apparatus now to be described prevents this hunting of the regulator. A rod 42 is slidably mounted in fixed bearings 43 and is provided with a socket in its lower end in which the head 44 of a second rod 45 is free to turn. The rod 42 carries the contact arm 46 forming the point C of the Wheatstone bridge, and a second contact arm 47 connected through lead 48 to the negative side of the mains 6. The contact arm 47 is arranged to travel over fixed contacts 49 and 50 with upward and downward movement respectively of the rod 42. The rod 45 is threaded throughout its lower half and provided with longitudinal slots 51 along its upper half. A member 52 is screwed over the threaded portion of the rod 45 and is supported in a fixed bearing 53 in which it is free to turn but not to travel vertically. A gear 54 forming a part of the member 52 meshes with a gear 55 on the shaft of a reversible motor 56, which motor is connected in parallel with motor 35 and is therefore actuated whenever the motor 35 is actuated. The upper half of the rod 45 passes through a member 57 to which it is keyed by means of longitudinal ridges on the inner side of the member which fit into the slots 51. The member 57 is mounted in a fixed bearing 58 in which it is free to turn but not to move vertically. A gear 59 forms a part of the member 57 and meshes with a gear 60 driven by a third reversible motor 61, one terminal of which is connected through lead wire 62 to the positive side of the mains 6 and the other terminals of which are connected to the stationary contacts 49 and 50. The arrangement of the motors 56 and 61 with the rod 45 is such that either motor can raise or lower the rod, and if both motors are operating at the same time the travel of the rod will be either the sum or difference of the travels that would be caused by either motor alone, depending upon whether the motors are aiding or opposing each other. As shown, the gear 54 has a smaller diameter than the gear 59 and correspondingly fewer teeth, with the result that with equal speeds of the motors, the rod will travel more rapidly with the motor 56 than with the motor 61.

The operation of the entire device is as follows: With the desired constant temperature of the liquid 2 and a consequent constant E. M. F. generated by the thermocouple, the apparatus will be as shown with the galvanometer needle 14 in the mid position, with the contact arm 47 of the rod 42 intermediate and not touching fixed contacts 49 and 50, and with the motors 35, 56 and 61 idle. If now, for any reason, the temperature of the liquid 2 falls, there will be a reduction in the E. M. F. generated by the thermocouple and a consequent flow of current through the galvanometer in a direction to close contacts 21 and 23 to thus cause motors 35 and 56 to operate, the former to increase the heating current to the coil 3 and the latter to move contact 46 in a direction to decrease the resistance of 12a and increase that of 12b. This shifting of the point C of the Wheatstone bridge tends to balance the same for a lower value of the temperature of the bath and thus to break the circuits for motors 35 and 56 prior to the complete return of the temperature to that desired. The lifting of rods 45 and 42 by motor 56 not only causes the shifting of the point C of the bridge, as above described, but also causes contacts 47 and 49 to meet and close the circuit for motor 61 to drive it in such a direction as to oppose the upward movement of the rod 45. While motors 56 and 61 both operate at once, the action of the latter is only to slow up the travel of the rods, but as soon as the point C has been shifted sufficiently to restore balance on the bridge and consequently to stop motor 56, the action of motor 61 is to slowly lower the rods and thus to return the point C to its initial position. The speeds of the motors 56 and 61 or the size of the gears therefor are preferably so chosen that the time taken for a change in the resistance 7 to be felt as a change in the E. M. F. generated by the thermocouple will correspond with that taken by the motor 61 to return the contact point C to its initial position.

With an increase in temperature in the liquid 2 caused for any reason, the operation of the apparatus is of course just the reverse of that described above. Deflection of the galvanometer needle will be caused by an increase in the E. M. F. generated by the thermocoupel and contacts 21 and 23 will be closed, thus operating motors 35 and 56, the former to increase the resistance 7 and the latter to shift the contact point C of the bridge in a direction to increase the resistance 12a and decrease the resistance 12b. A balance of the bridge will thus tend to be established at a higher temperature with consequent opening of the circuits for motors 35 and 56. The motor 61 actuated when the rod was lowered by motor 56 gradually returns the apparatus to the neutral position.

If the change in resistance 7 effected by the motor 35 has not been sufficient to restore the temperature of the liquid 2 to that desired by the time the motors 35 and 56 have been stopped, then these motors will again be energized as soon as the contact C has been sufficiently returned toward its initial position.

Where the temperature to be controlled is considerably above that of the surroundings, the E. M. F. generated by the thermocouple will follow closely the temperature of the hot junction, the sluggish and slight variation in the temperature of the cold junction being substantially negligible as compared with the variation at the hot junction. If desired, however, variations in the thermocouple E. M. F. due to cold junction temperature variations may be compensated for in any well known manner. For instance, the cold junction may be placed in close proximity to the resistance 11 so as to be at the same temperature therewith, as indicated in Fig. 1, and the resistance 11 may be a coil wound with wire of high temperature coefficient having a definite and exact change of resistance in proportion to change in temperature of the coil.

I have now described and illustrated my invention as applied to the maintenance of a constant temperature of a liquid bath. If instead of the maintenance of a constant temperature it were desired to vary the temperature in any desired manner it is only necessary to replace the battery 13 by a suitably varying E. M. F. Obviously my invention is not limited to the control of temperature as it is adapted for any type of control where-in an electric force gives a measure of the result of regulation.

Although I have shown the variable arm of the resistance 7 and the gear 54 driven by separate motors, it obviously would not change the operation of my regulator if both of these elements were driven by the same motor. Two motors, however, are more convenient in the case where the variable resistance 7 is at some distance from the rest of the apparatus.

My apparatus is in some respects like, and in other respects unlike, a step by step regulator. Its likeness consists in the fact that the regulation is automatically checked before the force on the balance returns to that to which it is regulated, but there the likeness ceases. My regulator attempts to make the correct change in one step but if this step is not sufficient it makes a further correction. The length of any step depends upon the actual magnitude of the change in the element and also upon duration of this change. A momentary increase or decrease in temperature, no matter how large, results in a very small change in the heating current and an immediate return to the original setting while a large permanent change results in a large change in the heating current.

Obviously many substitutions and rearrangements of parts may be made without departing from the scope of my invention and parts of my apparatus may be advantageously employed without the corresponding use of other parts. My invention is not limited to the particular Wheatstone bridge arrangement illustrated as any other suitable means for comparing two electromotive forces could be as readily employed, nor where the Wheatstone bridge arrangement is employed is it essential that the thermocouple be located in the bridging arm, as the apparatus would operate satisfactorily with the thermocouple in any one of the five arms of the bridge. I prefer, however, to use the arrangement illustrated, as this insures a linear relationship between change in electromotive force generated by the thermocouple and change in resistance 12 necessary to restore the temporary balance, and likewise it prevents current from passing through the thermocouple except during unbalance of the bridge.

I claim:

1. In a regulating apparatus, a movable regulating member, an electro-responsive actuating device therefor, an electric balance subjected to an electric regulating force and to a second electric force varied by but lagging after the movement of said member, said balance, when disturbed, continuously energizing said electro-responsive device, and means cooperatively related to said electro-responsive device to temporarily react upon said balance in a direction to anticipate the change in said second electric force.

2. The combination according to claim 1 wherein said electric balance is a Wheatstone bridge having a galvanometer in the bridging member thereof, and wherein the needle of said galvanometer when deflected closes a circuit for said electro-responsive device.

3. In a regulating apparatus, a movable regulating member and a regulator therefor, means for creating an electrical regulating force, means for creating a second electrical force varied by the movement of said member, electrical balancing means for comparing said forces, means controlling said regulator and continuously actuated by an unbalance of said balancing means, means actuated simultaneously with said last mentioned means and adapted to react upon said balancing means to restore said balance in advance of the restoration thereof by the force varied by the movement of said member, and means cooperatively related to said last mentioned means to be thereafter brought into operation for gradually cancelling the effect thereof.

4. In a regulating apparatus the combination comprising a member to be controlled and a regulator therefor, means for creating an electrical regulating force, means for creating a second electrical force varying as a function of the position of said member, an electrical network adapted to compare and balance said electric forces, means for controlling said regulator and continuously actuated upon an unbalance of said network, means actuated simultaneously with said last mentioned means and adapted to vary elements of said network in a direction to restore the balance thereof, and slower acting means cooperatively associated with said last mentioned means for gradually returning the elements of said network to their original value.

5. The combination according to claim 4 wherein said network is a Wheatstone bridge the source of electro-motive force therefor being said regulating electric force and said second electrical force being located in one of the five branches thereof and wherein the means actuated simultaneously with the means for controlling the regulator vary resistances in two branches of said bridge while maintaining their sum constant.

6. The combination according to claim 4 wherein said network includes two branches in which are resistance elements varied oppositely by said means actuated simultaneously with said regulator controlling means.

7. In a regulating apparatus, a movable regulator member, means for creating a regulating electro-motive force, means for creating a second electro-motive force varied by but lagging after the movement of said member, a reversible electric motor for actuating said regulating member, a Wheatstone bridge receiving current from said regulating electro-motive force and having said second electro-motive force located in one of its five branches, a galvanometer in the bridging arm of said bridge, means cooperatively associated with the needle of said galvanometer for actuating said motor upon deflection of the needle, a second reversible electric motor arranged in parallel with said first mentioned motor, means driven by said second motor for shifting one contact point of the bridging arm in a direction tending to return the galvanometer to the normal neutral position, and means later brought into operation and continuing after said reversible motors have become idle to gradually return the contact point of the bridging arm to its initial position.

8. In a regulator for controlling the temperature of an element, the combination comprising means for varying the temperature of the element, means for creating a regulating electro-motive force, means for creating an electro-motive force varying with the temperature of the element, a Wheatstone bridge receiving current from said regulating electro-motive force and including said last-mentioned electro-motive force in series with a galvanometer in the bridging arm thereof, means associated with the galvanometer needle and brought into operation upon an unbalance of the bridge for actuating the means for varying the temperature, means actuated simultaneously with said last mentioned means for shifting one contact point of the bridging arm in a direction to restore the balance, and slower acting means later brought into operation for returning the contact of the bridging arm to its original position.

In testimony whereof, I have signed my name to this specification.

CHARLES H. SMOOT.